United States Patent
Mottes et al.

(10) Patent No.: US 11,032,676 B2
(45) Date of Patent: Jun. 8, 2021

(54) SYSTEM AND METHOD FOR TRANSLITERATION OF TEXTUAL MESSAGES FOR MOBILE DEVICES

(71) Applicant: VascoDe Technologies Ltd., Tel Aviv (IL)

(72) Inventors: Dorron Mottes, Tel Aviv (IL); Gil Zaidman, Kfar Vitkin (IL); Arnon Yaar, Ramat Hasharon (IL)

(73) Assignee: VascoDe Technologies Ltd., Tel Aviv (IL)

( * ) Notice: Subject to any disclaimer, the term of this patent is extended or adjusted under 35 U.S.C. 154(b) by 543 days.

(21) Appl. No.: 14/022,774

(22) Filed: Sep. 10, 2013

(65) Prior Publication Data
US 2014/0273999 A1  Sep. 18, 2014

Related U.S. Application Data

(60) Provisional application No. 61/779,109, filed on Mar. 13, 2013.

(51) Int. Cl.
| | |
|---|---|
| *H04L 29/08* | (2006.01) |
| *H04W 4/14* | (2009.01) |
| *H04W 4/18* | (2009.01) |
| *H04L 12/58* | (2006.01) |

(52) U.S. Cl.
CPC .......... *H04W 4/14* (2013.01); *H04L 51/066* (2013.01); *H04W 4/18* (2013.01)

(58) Field of Classification Search
CPC  H04W 4/16; H04W 4/14; H04W 4/18; H04L 51/066; H04L 69/08; G06F 40/58; G06F 9/454; H04M 2250/58; H04M 2250/70

USPC .......................................... 455/414.4, 414.2
See application file for complete search history.

(56) References Cited

U.S. PATENT DOCUMENTS

| | | | | |
|---|---|---|---|---|
| 6,161,082 | A  * | 12/2000 | Goldberg et al. | 704/3 |
| 6,996,520 | B2 * | 2/2006 | Levin | 704/10 |
| 7,310,605 | B2 * | 12/2007 | Janakiraman et al. | 704/277 |
| 8,204,213 | B2 | 6/2012 | Hunt et al. | |
| 8,275,601 | B2 | 9/2012 | Wang et al. | |
| 8,473,280 | B2 * | 6/2013 | Al-Omari et al. | 704/9 |
| 8,509,824 | B2 * | 8/2013 | Bennett | 455/466 |
| 8,554,537 | B2 * | 10/2013 | Rai et al. | 704/2 |
| 8,612,206 | B2 * | 12/2013 | Chalabi et al. | 704/8 |
| 2006/0079281 | A1* | 4/2006 | Ravindra | G06F 3/018 455/558 |
| 2007/0180143 | A1* | 8/2007 | Greeff | G06F 17/289 709/246 |
| 2008/0097741 | A1* | 4/2008 | Bagnato et al. | 704/2 |

(Continued)

*Primary Examiner* — Matthew C Sams
(74) *Attorney, Agent, or Firm* — M&B IP Analysts, LLC

(57) ABSTRACT

A method and system for transliteration of a textual message are provided. The method includes receiving, from a first network texting element, the textual message sent from a first mobile device and destined to a second mobile device, wherein the textual message comprises a first character set; determining if the first character set is supported by the second mobile device; determining a second character set supported by the second mobile device when the first character set is not supported by the second mobile device; transliterating the textual message to the second character set; and sending the transliterated textual message to a second network texting element.

17 Claims, 3 Drawing Sheets

(56) References Cited

U.S. PATENT DOCUMENTS

| | | | |
|---|---|---|---|
| 2008/0270111 A1 | 10/2008 | Hanumanthappa | |
| 2011/0137635 A1* | 6/2011 | Chalabi | G06F 17/2863 704/2 |
| 2012/0165048 A1* | 6/2012 | Zhu | G06F 17/289 455/466 |
| 2012/0271619 A1* | 10/2012 | Abdel-Kader | G06F 17/214 704/3 |
| 2012/0302201 A1* | 11/2012 | Siomina | H04W 4/90 455/404.2 |
| 2013/0275117 A1* | 10/2013 | Winer | 704/3 |

* cited by examiner

SYSTEM AND METHOD FOR TRANSLITERATION OF TEXTUAL MESSAGES FOR MOBILE DEVICES

CROSS-REFERENCE TO RELATED APPLICATIONS

This patent application claims priority from U.S. provisional patent application 61/779,109, filed on Mar. 13, 2013, the contents of which are incorporated herein by reference.

TECHNICAL FIELD

The invention generally relates to communication to and from a mobile device and particularly to transliterating textual messages to and from a mobile device, and even more particularly to mobile phones supporting a limited character set.

BACKGROUND

In many developing countries, but also elsewhere, users are not able to afford mobile phones supporting local character sets. For that purpose transliteration is often used, that is, a text is converted from one set of characters, or script, to another set of characters. For example, the Greek word 'άτομο' may be transliterated to 'atomo' allowing a device not supporting the Greek character set to nevertheless display the word.

However, a first device sending a text message to a second mobile device may elect to send the message in any character set that the first mobile device supports, hence the receiving side, the second mobile device, may receive unrecognized characters or ineligible text. For example, the first mobile device sends a text message containing Greek characters, while the second device does not support such a character set. Thus, the second device cannot recognize the contents of the received text message. Certain web sites provide transliteration services that allow transliteration of messages. However, such web sites do not provide an automatic mobile device to mobile device transliteration.

It would therefore be advantageous to provide a solution that would provide a message on a device receiving a text message in one character set to be displayed in a character set supported by the receiving device.

SUMMARY

Certain embodiments disclosed herein include a method for transliteration of a textual message. The method includes receiving, from a first network texting element, the textual message sent from a first mobile device and destined to a second mobile device, wherein the textual message comprises a first character set; determining if the first character set is supported by the second mobile device; determining a second character set supported by the second mobile device when the first character set is not supported by the second mobile device; transliterating the textual message to the second character set; and sending the transliterated textual message to a second network texting element.

Certain embodiments disclosed herein include also include system for transliteration of a textual message. The system includes a processing unit; an interface to a network communicatively coupled to the processing unit, for communicating with at least a first device and a second device; and a memory communicatively coupled to the processing unit, the memory containing instructions that when executed by the processing unit configure the system to: receive, from a first network texting element, the textual message sent from a first mobile device and destined to a second mobile device, wherein the textual message comprises a first character set; determine if the first character set is supported by the second mobile device; determine a second character set supported by the second mobile device when the first character set is not supported by the second mobile device; transliterate the textual message to the second character set; and send the transliterated textual message to a second network texting element.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

Figure 1:
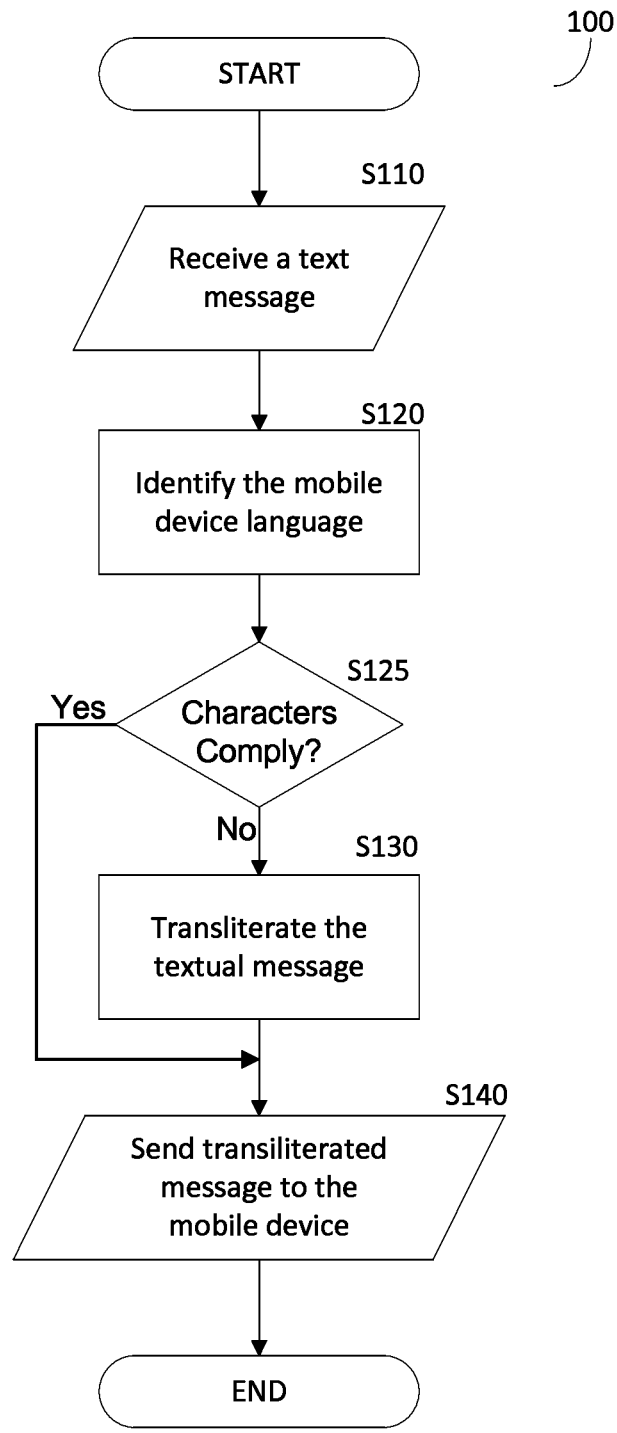
FIG. 1 is a flowchart of a method for transliteration of a textual message according to one embodiment.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

A system and method, disclosed according to certain exemplary embodiments, provide a solution for transliteration of textual messages to and from mobile devices. According to the certain exemplary embodiments, an input language of the mobile device receiving a textual message, and a destination respective of the message is determined, then the textual message is transliterated to the user's desired language or to the mobile device's input language, and the transliterated textual message is sent to the destination mobile device. The method is performed by a system, or a transliterating server deployed in a cellular network and communicatively connected to the receiving and sending devices.

FIG. 1 is a non-limiting exemplary flowchart 100 of a method for transliteration of a textual message according to one embodiment. In S110 a text message is received, for example by a transliteration server 300, described in greater detail below. The textual message may include, but is not limited to, a message sent between mobile devices, such as short message system (SMS) messages, messages sent using protocols such as unstructured supplementary service data (USSD), or any text that may require transliteration.

The textual message may be received, for example, from a network texting element or a user mobile device. The network texting element may be a short message service center (SMSC), a USSD gateway, and the like. The transliteration server 300 may be implemented, for example, within a network texting element or as a server communicatively connected to such an element. The textual message may be initially sent from a user mobile, a SMS server, a SMS gateway, and the like. The SMS server and gateway typically generate and send text messages to a wide distribution list.

In S120 a supported character set respective of a destination mobile device is determined. In one embodiment, such a determination is made by checking against a database of the transliteration server 300. The database may hold, for example, a list of mobile device models, a list of mobile subscribers or a list of phone numbers, and their respective supported character set or sets. Alternatively, the determination is performed based on interrogation of the destination device. The interrogation may be performed, for example, by sending the destination device an SMS requesting a response to identify the character set being used. In another exemplary embodiment, such checks can also be made using other control protocols such as, but not limited to, USSD.

In S125, a check is made if the characters of the received text message comply with the character set of the destination device. If so, execution continues with S140 where the received text message is relayed to the destination device; otherwise, execution proceeds to S130.

In S130, transliteration of the received text takes place, if necessary, i.e., if the character set supported by the destination device is different from that of the sending device. For example, the Greek word 'άτομο' is transliterated to 'atomo'. In one embodiment, the transliteration takes place in the transliteration server 300 by, for example, containing lists of transliteration of words from the original character set to a transliterated character set. In another embodiment, the transliteration takes place such that a there is one-to-one mapping from a first character set to a second character set. For example, the Greek character 'ά' is always transliterated to 'a' and the Greek character 'τ' is always transliterated to 't'. Each such transliteration can then be checked for existence in a database of the transliteration server 300 to further confirm the accuracy of such transliteration. In another embodiment, a spelling check process is performed on the transliterated text to determine the validity of the transliteration. The spelling check process can be implemented by the transliteration server 300. In one embodiment, if the transliteration server 300 encounters an unrecognized character set, then the server 300 may query transliteration web services to provide proper transliterated text.

In S140 the message, either original if no transliteration was necessary, or the transliterated message, is sent to the destination mobile device. In one embodiment, the transliterated message is sent to the network texting element (e.g., the SMSC or USSD gateway) which forwards the message to the destination mobile device. It should be noted that the network texting element forwarding the message to the transliteration server 300 may be different than the texting element sending the message to the destination mobile device. The different network texting elements may be operable by the same network carrier or different network carriers.

Figure 2:
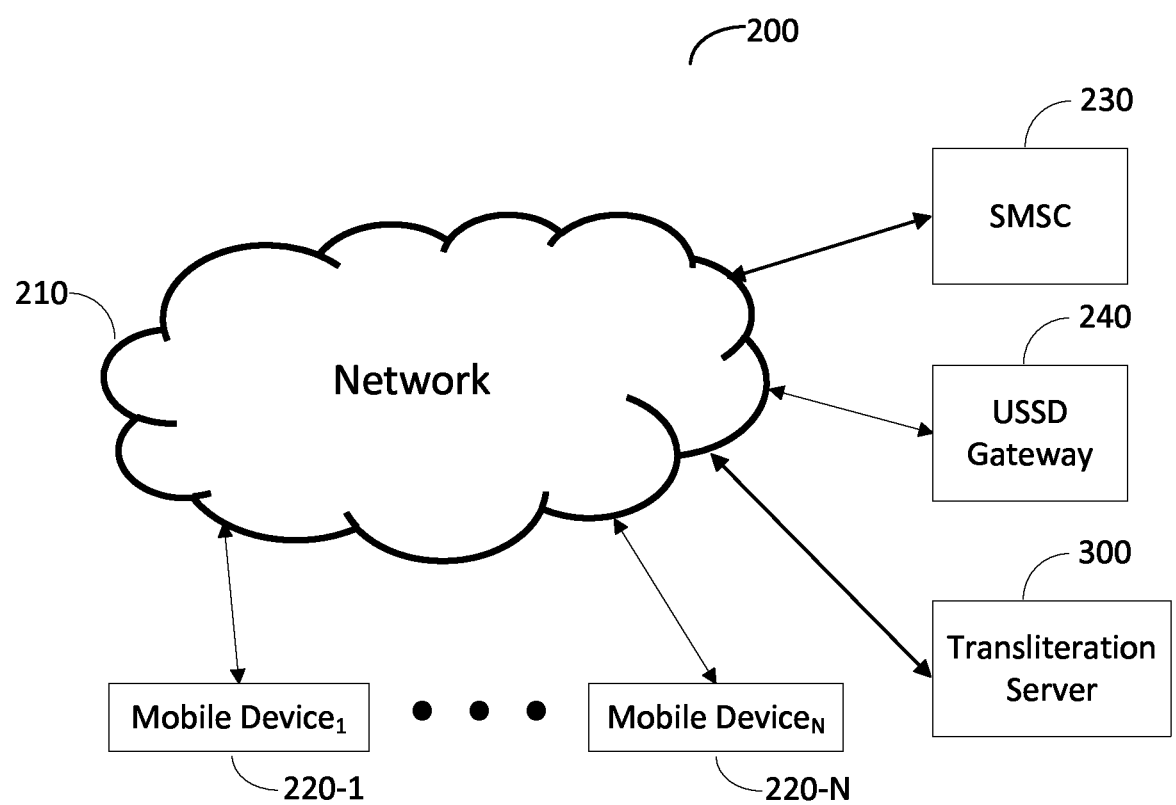
FIG. 2 is a schematic diagram of a system for performing transliteration according to one embodiment.

FIG. 2 depicts an exemplary and non-limiting schematic diagram of a network system 200 utilized to describe the embodiments for performing transliteration. The network system 200 includes a network 210 that comprises cellular, wireless and wired networks in any combination necessary for communicatively connecting a plurality of mobile devices 220, for example mobile devices 220-1 through 220-N, where N is an integer having a value of '2' or larger. At least one mobile device, designated as a receiving mobile device of the plurality of mobile devices 220, does not support a character set supported by a sending mobile device of the plurality of mobile devices 220.

Furthermore, to the network 210 is connected at least a transliteration server 300, which performs the transliteration as further explained herein above. According to an embodiment, a mobile device, for example mobile device 220-1, attempts to send a text message to another mobile device, for example mobile device 220-N. The message is routed through the transliteration server 300. The network 210 may be further communicatively connected to a SMSC 230 and/or USSD gateway 240 depending on the configuration of the cellular network of the network 210. In the embodiment illustrated in FIG. 2, the transliteration server 300 is communicatively connected to the USSD gateway 240. Alternatively, the transliteration server 300 is communicatively connected to the SMSC 230 or to both the USSD gateway 240 and the SMSC 230. In another embodiment, the transliteration server 300 may be implemented, within the SMSC 230 and/or within the USSD gateway 240.

The SMSC 230 and the USSD gateway 240 are configured to forward textual messages received, for example, from mobile device 220-1, to the transliteration server 300. The transliteration server 300 returns a transliterated textual message to the unit from which the message was received (e.g., the SMSC 230 or USSD gateway 240). Thereafter, the transliterated textual message is forwarded to the destination mobile device by the SMSC 230 and/or USSD gateway 240. It should be noted that SMSCs and USSD gateways are standard elements of a cellular network typically utilized to store, forward, and deliver textual messages. The USSD gateways communicate using a USSD protocol. In an embodiment, the configuration of the SMSC 230 and the USSD gateway 240 for forwarding received messages to the transliteration server 300 may be performed by network carrier. The transliteration server 300 is configured to perform transliteration according to the exemplary and non-limiting method described with respect of FIG. 1.

It should be noted that while the sending device and receiving device may be different mobile devices, as described hereinabove, in an embodiment the source and the destination devices may be the same device. In yet another embodiment, at least a portion of the transliteration occurs on either one of the sending or receiving devices. That is, the transliteration server 300, maybe embodied, for example, as an agent on the mobile device. Full or partial transliteration may take place on the mobile device. That is, the mobile device may be configured to transliterate only certain popular words while others would require the use of an external server, such as server 300 described hereinabove.

Figure 3:
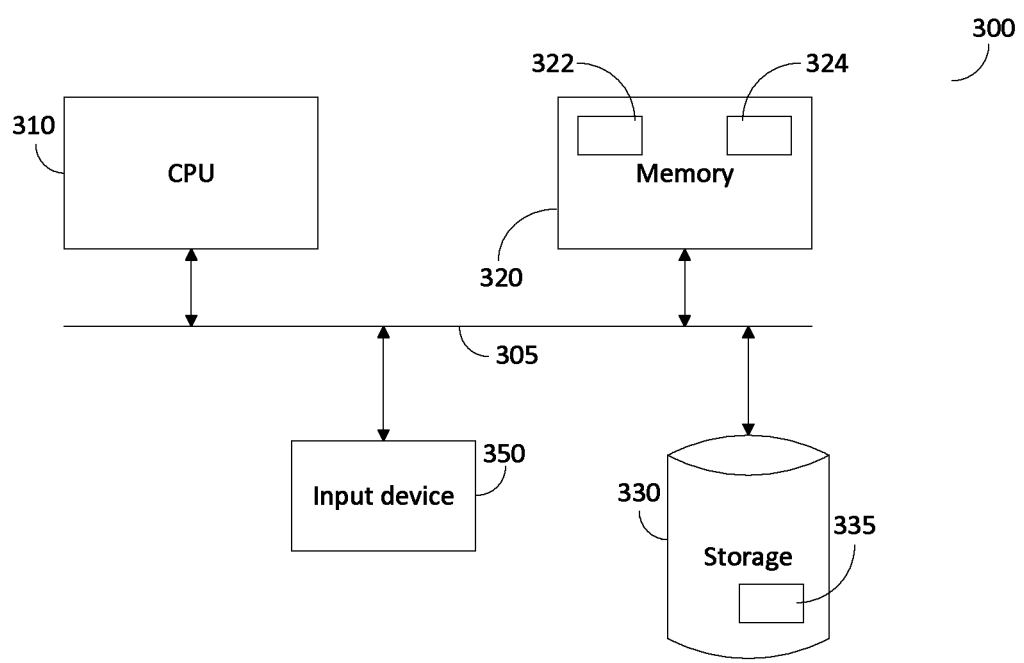
FIG. 3 is of a transliteration server implemented according to one embodiment.

FIG. 3 depicts an exemplary and non-limiting schematic illustration of the transliteration server 300, implemented according to one embodiment. The transliteration server 300 comprises a processing element 310, for example, one or more central processing units (CPUs), that is coupled via a bus 305 to a memory 320. The memory 320 further comprises a memory portion 322 that contains instructions that when executed by the processing element 310 performs the method described in more detail herein. The memory 320 may be further used as a working scratch pad for the processing element 310, a temporary storage, and for other uses, as the case may be. The memory may be comprised of volatile memory such as, but not limited to random access memory (RAM), or non-volatile memory (NVM), such as, but not limited to, Flash memory. The memory 320 may further comprise memory portion 324 containing data respective of at least one textual message or a textual message transliteration.

The processing element 310 may be coupled to an input device 350, e.g., a mouse and/or a keyboard, and a data storage 330. The data storage 330 may be used for the purpose of holding instructions for execution of the method in accordance with the disclosed technique. The data storage 330 may further comprise storage portion 335 containing data describing a transliteration process between at least two languages. In one embodiment, the data storage 330 stores the database utilized by the server 300 during the transliteration process. The database may include a list of mobile device models, a list of mobile subscribers or a list of phone numbers, and their respective supported character set or sets. The database may further include a list of interrogated devices and their respective supported character set or sets. The database, hence the data storage 330, may also maintain the transliteration of one-to-one mapping between two different character sets.

The embodiments disclosed herein can be implemented as hardware, firmware, software or any combination thereof. Moreover, the software is preferably implemented as an application program tangibly embodied on a program storage unit or non-transitory computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit and/or display unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method of transliteration of a textual message, comprising:
receiving, from a first network texting element, the textual message sent from a first mobile device and destined to a second mobile device, wherein the textual message comprises a first character set;
determining if the first character set is supported by the second mobile device, wherein determining if the first character set is supported by the second mobile device includes sending, to the second mobile device, a textual message requesting a response, wherein whether the first character set is supported by the second mobile device is determined based on a character set used by the response;
determining a second character set supported by the second mobile device when the first character set is not supported by the second mobile device, wherein the determination is made by checking a database containing information related to supported character sets of mobile devices;
transliterating the textual message to the second character set; and
sending the transliterated textual message to a second network texting element.

2. The method of claim 1, wherein at least a portion of the transliteration takes place on any one of: the first mobile device and the second mobile device.

3. The method of claim 1, wherein determining if the first character set is supported by the second mobile device further comprises:
sending a short message service (SMS) message to the second mobile device.

4. The method of claim 1, wherein transliterating the textual message further comprises:
performing one-to-one mapping of each character provided in the textual message from the first character set to the second character set; and
confirming accuracy of the transliterated textual message.

5. The method of claim 1, wherein the texting network element is at least one of: a short message service center (SMSC) and an unstructured supplementary service data (USSD) gateway.

6. The method of claim 1, wherein the first network texting element and the second network texting element are the same.

7. The method of claim 1, wherein the textual message is provided using any one of: short message system (SMS) messaging, unstructured supplementary service data (USSD), and text.

8. A non-transitory computer readable medium having stored thereon instructions for causing one or more processing units to execute the method according to claim 1.

9. A system for performing transliteration of a textual message, comprising:
a processing unit;
an interface to a network communicatively coupled to the processing unit, for communicating with at least a first device and a second device; and
a memory communicatively coupled to the processing unit, the memory containing instructions that when executed by the processing unit configure the system to:
receive, from a first network texting element, the textual message sent from a first mobile device and destined to a second mobile device, wherein the textual message comprises a first character set;
determine if the first character set is supported by the second mobile device, wherein determining if the first character set is supported by the second mobile device includes sending, to the second mobile device, a textual message requesting a response, wherein whether the first character set is supported by the second mobile device is determined based on a character set used by the response by the second mobile device is determined based on a character set used by the response;
determine a second character set supported by the second mobile device when the first character set is not supported by the second mobile device, wherein the determination is made by checking a database containing information related to supported character sets of mobile devices;

transliterate the textual message to the second character set; and send the transliterated textual message to a second network texting element.

10. The system of claim 9, wherein at least a portion of the transliteration takes place on any one of: the first mobile device and the second mobile device.

11. The system of claim 9, wherein the network comprises at least a cellular network for communication between the first device and the second device.

12. The system of claim 9, wherein the textual message is provided using any one of: short message system (SMS) messaging, unstructured supplementary service data (USSD), and text.

13. The system of claim 9, wherein the system is further configured to:

perform one-to-one mapping of each character provided in the textual message from the first character set to the second character set; and confirm at least validity and accuracy of the transliterated textual message.

14. The system of claim 9, wherein the network texting element is at least one of: short message service center (SMSC) and an unstructured supplementary service data (USSD) gateway.

15. The system of claim 14, wherein the system is implemented in the network texting element.

16. The system of claim 15, wherein the first network texting element and the second network texting element are the same.

17. A computerized method of transliteration of a textual message, comprising:

receiving, from a first network texting element, the textual message sent from a first mobile device and destined to a second mobile device, wherein the textual message comprises a first character set;

determining if the first character set is supported by the second mobile device, wherein determining if the first character set is supported by the second mobile device includes sending, to the second mobile device, a textual message requesting a response, wherein whether the first character set is supported by the second mobile device is determined based on a character set used by the response;

determining a second character set supported by the second mobile device when the first character set is not supported by the second mobile device, wherein the determination is made by checking a database containing information related to supported character sets of mobile devices;

transliterating the textual message to the second character set, wherein a first portion of the transliteration takes place on any one of the first mobile device and the second mobile device, wherein a second portion of the transliteration takes place on a server; and sending the transliterated textual message to a second network texting element.

* * * * *